United States Patent
Jin

(10) Patent No.: US 8,929,421 B2
(45) Date of Patent: Jan. 6, 2015

(54) SUCCESSIVE INTERFERENCE CANCELLATION METHOD AND APPARATUS AND DETECTION METHOD AND APPARATUS USING SUCCESSIVE INTERFERENCE CANCELLATION

(71) Applicant: MStar Semiconductor, Inc., Hsinchu Hsien (TW)

(72) Inventor: Long-Bao Jin, Hsinchu County (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 0 days.

(21) Appl. No.: 13/950,929

(22) Filed: Jul. 25, 2013

(65) Prior Publication Data

US 2014/0029648 A1 Jan. 30, 2014

(30) Foreign Application Priority Data

Jul. 27, 2012 (CN) ...................... 2012 2 0370141 U

(51) Int. Cl.
  H04B 1/00 (2006.01)
  H04B 1/7103 (2011.01)
  H04B 1/7107 (2011.01)
(52) U.S. Cl.
  CPC .......... H04B 1/7103 (2013.01); H04B 1/71072 (2013.01)
  USPC .......................................................... 375/148

(58) Field of Classification Search
  USPC ......................................................... 375/148
  See application file for complete search history.

(56) References Cited

U.S. PATENT DOCUMENTS

| 5,410,750 | A  | * | 4/1995 | Cantwell et al. | 455/306 |
| 5,737,704 | A  | * | 4/1998 | Jin et al. | 455/450 |
| 6,188,897 | B1 | * | 2/2001 | Nelson | 455/432.1 |
| 2004/0202140 | A1 | * | 10/2004 | Kim et al. | 370/335 |
| 2007/0217405 | A1 | * | 9/2007 | Beshai | 370/375 |
| 2009/0275356 | A1 | * | 11/2009 | Chapman et al. | 455/522 |
| 2014/0098783 | A1 | * | 4/2014 | Wan et al. | 370/330 |

* cited by examiner

*Primary Examiner* — Santiago Garcia
(74) *Attorney, Agent, or Firm* — WPAT, PC; Justin King

(57) ABSTRACT

A successive interference cancellation method includes: determining whether a current interfering user channel is a service cell channel of a service cell or a neighbor cell channel of a neighbor cell; correcting a phase rotation of a user signal of the neighbor channel when the interfering user channel is the neighbor cell channel; determining a tentative ruling for a user signal of the neighbor cell channel; restoring the phase rotation of the user signal of the neighbor cell channel; performing a signal reconstruction on the neighbor cell channel to obtain a reconstructed signal of the neighbor cell channel; removing the reconstructed signal of the neighbor cell channel from a reception signal to obtain a corrected signal, and completing successive interference cancellation on the current interfering user channel. With the above successive interference cancellation method, accuracy of successive interference cancellation as well as system detection performance is enhanced.

16 Claims, 6 Drawing Sheets

US 8,929,421 B2

SUCCESSIVE INTERFERENCE CANCELLATION METHOD AND APPARATUS AND DETECTION METHOD AND APPARATUS USING SUCCESSIVE INTERFERENCE CANCELLATION

This application claims the benefit of People's Republic of China Patent Application Serial No. 201220370141.9, filed on Jul. 27, 2012, the subject matter of which is incorporated herein by reference.

BACKGROUND OF THE INVENTION

1. Field of the Invention

The invention relates in general to signal detection, and more particularly to a successive interference cancellation method and apparatus and a detection method and apparatus using successive interference cancellation.

2. Description of the Related Art

In a code division multiple access (CDMA) communication system, signals of multiple users are overlapped in a time domain and in a frequency domain. As the signals of the users are correlated at a certain level, multiple access interference (MAI) is caused. The MAI includes priori information, such as known user channel codes and channel estimations, utilized for signal separation. A method that considers the separation of all user signals by fully employing the priori information in the MAI as a unified process is referred to as a multiple user detection-joint detection (MUD-JD). Among various MUD-JD techniques, successive interference cancellation (SIC) is prevalent.

It is discovered by the Applicant in long-term researches that, due to high-speed movements of a terminal, a greater Doppler shift is generated at user signals of a neighbor cell channel. In current successive interference cancellation methods, influences of a frequency shift of a neighbor cell channel upon a successive interference cancellation determination and reconstruction process are not considered. Referring to FIG. 1, assuming that an error block rate is 0.01, detection performance of successive interference cancellation without considering the frequency shift of a neighbor cell channel is −27.3 dB, detection performance of successive interference cancellation with a 100 Hz frequency shift in a neighbor cell channel is −23.2 dB, and detection performance of successive interference cancellation with a 200 Hz frequency in a neighbor cell channel is −19.5 dB. Thus, compared to successive interference cancellation perform without considering the frequency shift of a neighbor cell channel, successive interference cancellation performed with a 100 Hz frequency shift in a neighbor cell channel suffers from a 4.1 dB detection performance loss, and successive interference cancellation performed with a 200 Hz frequency shift in a neighbor cell channel suffers from a 7.8 dB detection performance loss. As seen from the above, the frequency shift of a neighbor cell channel causes errors in determined and reconstructed signals after the successive interference cancellation, leading to degradation in accuracy of the successive interference cancellation as well as in system detection performance.

SUMMARY OF THE INVENTION

The invention is directed to successive interference cancellation method and apparatus, and a detection method and apparatus using successive interference cancellation, which are capable of enhancing accuracy of successive interference cancellation and system detection performance.

According to an aspect of the present invention, a successive interference cancellation method is provided. The successive interference cancellation method comprises: determining whether an interfering user channel is a service cell channel of a service cell or a neighbor cell channel of a neighbor cell; correcting a phase rotation of a user signal of the neighbor cell channel when the interfering user channel is the neighbor cell channel, wherein the user signal of the neighbor cell channel is obtained from a spreading code and a convolution of a channel estimation of a neighbor cell user; determining a tentative ruling for the user signal of the neighbor cell channel after correcting the phase rotation of the user signal of the neighbor cell channel; restoring the phase rotation of the user signal of the neighbor cell channel after determining the tentative ruling for the user signal of the neighbor cell channel; performing a signal reconstruction on the neighbor cell channel to obtain a reconstructed signal; and removing the reconstructed signal of the neighbor cell channel from a reception signal to obtain a corrected signal to complete successive interference cancellation on the current interfering user channel. The reception signal is obtained from spreading codes and convolutions of channel estimations of the neighbor cell user and a service cell user, respectively.

According to another aspect of the present invention, a detection method using successive interference cancellation is provided. The detection method using successive interference cancellation comprises: determining whether an interfering user channel is a service cell channel of a service cell or a neighbor cell channel of a neighbor cell; correcting a phase rotation of a user signal of the neighbor cell channel when the interfering user channel is the neighbor cell channel, wherein the user signal of the neighbor cell channel is obtained from a spreading code and a convolution of a channel estimation of a neighbor cell user; determining a tentative ruling for the user signal of the neighbor cell channel after correcting the phase rotation of the user signal of the neighbor cell channel; restoring the phase rotation of the user signal of the neighbor cell channel after determining the tentative ruling for the user signal of the neighbor cell channel; performing a signal reconstruction on the neighbor cell channel to obtain a reconstructed signal; and removing the reconstructed signal of the neighbor cell channel from a reception signal to obtain a corrected signal to complete successive interference cancellation on the current interfering user channel. The reception signal is obtained from spreading codes and convolutions of channel estimations of the neighbor cell user and a service cell user, respectively.

According to another aspect of the present invention, a successive interference cancellation apparatus is provided. The successive interference cancellation apparatus comprises: a channel determination module, for determining whether an interfering user channel is a service cell channel of a service cell or a neighbor cell channel of a neighbor cell; a phase rotation correction module, for correcting a phase rotation of a user signal of the neighbor cell channel when the interfering user channel is the neighbor cell channel, wherein the user signal of the neighbor cell channel is obtained from a spreading code and a convolution of a channel estimation of a neighbor cell user; a tentative ruling module, for determining a tentative ruling for the user signal of the neighbor cell channel after correcting the phase rotation of the user signal of the neighbor cell channel; a phase restoration module, for restoring the phase rotation of the user signal of the neighbor cell channel after determining the tentative ruling for the user signal of the neighbor cell channel; a signal reconstruction module, for performing a signal reconstruction on the neighbor cell channel to obtain a reconstructed signal; and a signal removal module, for removing the reconstructed signal of the neighbor cell channel from a reception signal to obtain a corrected signal to complete successive interference cancellation on the current interfering user channel. The reception signal is obtained from spreading codes and convolutions of channel estimations of the neighbor cell user and a service cell user, respectively.

According to yet another aspect of the present invention, a detection apparatus using successive interference cancellation is provided. The detection apparatus using successive interference cancellation comprises: a channel determination module, for determining whether an interfering user channel is a service cell channel of a service cell or a neighbor cell channel of a neighbor cell; a phase rotation correction module, for correcting a phase rotation of a user signal of the neighbor cell channel when the interfering user channel is the neighbor cell channel, wherein the user signal of the neighbor cell channel is obtained from a spreading code and a convolution of a channel estimation of a neighbor cell user; a tentative ruling module, for determining a tentative ruling for the user signal of the neighbor cell channel after correcting the phase rotation of the user signal of the neighbor cell channel; a phase restoration module, for restoring the phase rotation of the user signal of the neighbor cell channel after determining the tentative ruling for the user signal of the neighbor cell channel; a signal reconstruction module, for performing a signal reconstruction on the neighbor cell channel to obtain a reconstructed signal; and a signal removal module, for removing the reconstructed signal of the neighbor cell channel from a reception signal to obtain a corrected signal to complete successive interference cancellation on the current interfering user channel. The reception signal is obtained from spreading codes and convolutions of channel estimations of the neighbor cell user and a service cell user, respectively.

Different from the prior art, in the successive interference cancellation method and apparatus and the detection method and apparatus using successive interference cancellation, whether a current interfering user channel is a service cell channel of a service cell or a neighbor cell channel of a neighbor cell is determined. When the interfering user channel is the neighbor cell channel, a phase rotation of the user signal of the neighbor cell channel is corrected, a tentative ruling for the user signal of the neighbor cell is determined, the phase rotation of the user signal of the neighbor cell channel is restored, a signal reconstruction is performed on the neighbor cell channel to obtain a reconstructed signal, and the reconstructed signal of the neighbor cell channel is removed from a reception signal to obtain a corrected signal to complete the successive interference cancellation on the current interfering user channel. As such, accuracy of successive interference cancellation is increased to enhance system detection performance.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 1:
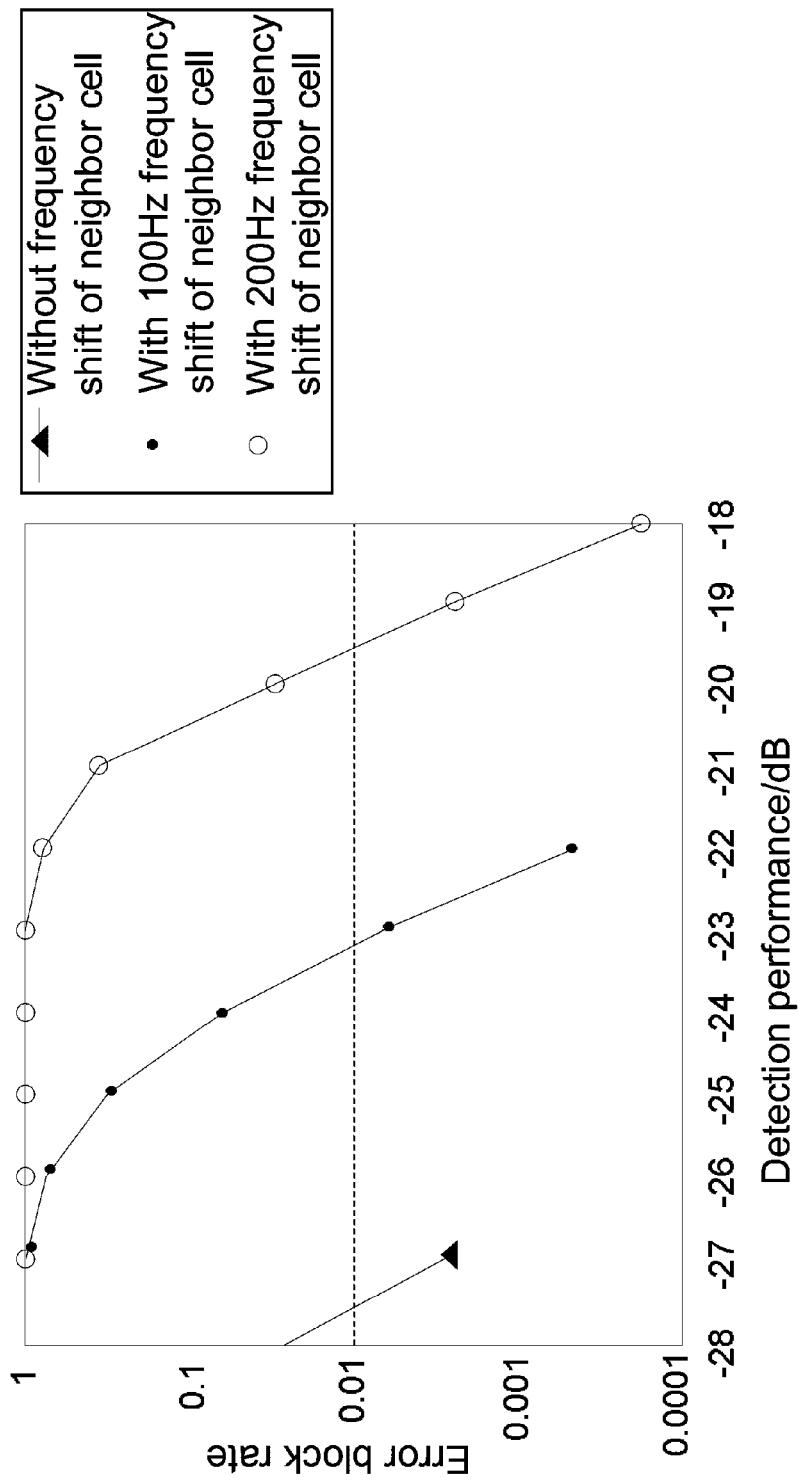
FIG. 1 is a simulation diagram of detection performance of a successive interference cancellation technique of the prior art.
Figure 2:
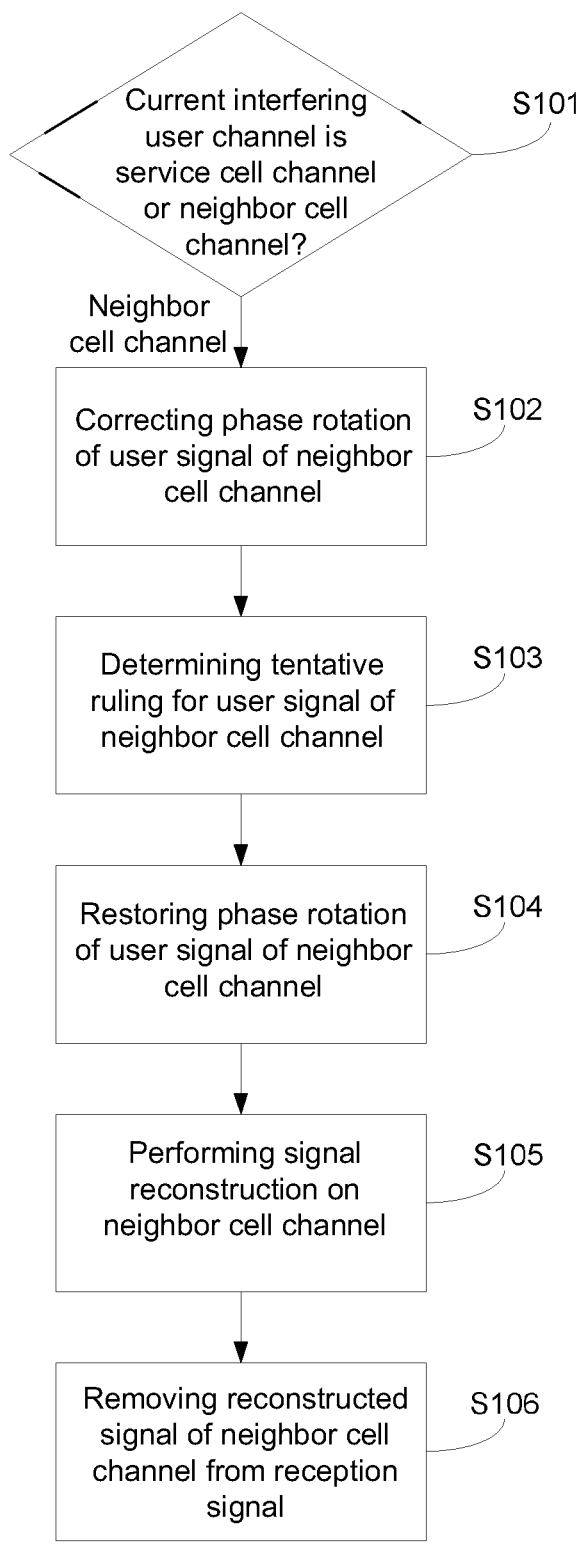
FIG. 2 is a flowchart of a successive interference cancellation method according to an embodiment of the present invention.

Referring to FIG. 2, a successive interference cancellation method according to an embodiment of the present invention comprises the following steps.

In step S101, whether a current interfering user cell channel is a service cell channel of a service cell or a neighbor cell channel of a neighbor cell is determined. That is, it is determined whether a current interfering user cell channel is a service cell channel of a service cell or a neighbor cell channel of a neighbor cell.

In step S102, a phase rotation of a user signal of the neighbor cell channel is corrected. When the interfering user cell channel is the neighbor cell channel, a large frequency shift is generated in a user signal of the neighbor cell channel due to high-speed movements of a terminal. The frequency shift causes a rotation in signals of constellation points to lead to erroneous signal determination. Thus, the phase rotation of the user signal of the neighbor cell channel is corrected to mitigate influences of the frequency shift upon signals of the neighbor cell channel. The user signal of the neighbor cell channel is obtained from a spreading code and a convolution of a channel estimation of a neighbor cell user.

More specifically, the step of correcting the phase rotation of the user signal of the neighbor cell channel comprises correcting the phase rotation of the user signal of the neighbor cell channel by a coordinate rotation digital computer (CORDIC) algorithm. More specifically, the CORDIC algorithm is as:

$$\hat{r}_{n,k} = r_{n,k} * (d_{R,i+1} + j * d_{I,i+1}) * e^{j*\theta_{i+1}}$$

$$\begin{cases} d_{R,i+1} = K_i[d_{R,i} - d_{I,i} \cdot s_i \cdot 2^{-i}] \\ d_{I,i+1} = K_i[d_{I,i} + d_{R,i} \cdot s_i \cdot 2^{-i}] \\ \theta_{i+1} = \theta_i - s_i \cdot \tan^{-1}(2^{-i}) \\ K_i = 1/\sqrt{1 + 2^{-2 \cdot i}} \\ s_i = -1, \theta_i < 0 \\ s_i = 1, \theta_i \geq 0 \end{cases}$$

Wherein, $r_{n,k}$ is a frequency control signal of the neighbor cell, $\hat{r}_{n,k}$ is the user signal of the neighbor cell after correcting the phase rotation, and i is an computation iteration number. In the embodiment, a value of i is 8 to 12. With a look-up table (LUT), a tangent value $\tan^{-1}(2^{-i})$ is obtained, and a value of an amplitude factor $K_1$ is associated with the computation iteration number i and approximates 0.6073. After positioning, the CORDIC algorithm can be implemented through simple hardware of a phase shifter and an adder.

In step S103, a tentative ruling is determined for the user signal of the neighbor cell channel. That is, after correcting the phase rotation of the user signal of the neighbor cell channel, a tentative ruling is determined for the user signal of the neighbor cell channel. The tentative ruling of the user signal can be implemented by a hard decision or a soft decision.

In step S104, the phase rotation of the user signal of the neighbor cell channel is restored. After determining the tentative ruling on the user signal of the neighbor cell channel, the phase rotation of the user signal of the neighbor cell channel is restored according to the frequency control signal of the neighbor cell. The process of restoring the phase rotation is reverse to that of correcting the phase rotation, and may be also performed by use of a CORDIC algorithm.

In step S105, a signal reconstruction is performed on the neighbor cell channel. After restoring the phase rotation of the user signal of the neighbor cell channel, a signal reconstruction is performed on the neighbor cell channel to obtain a reconstructed signal of the neighbor cell channel.

In step S106, the reconstructed signal of the neighbor cell channel is removed from a reception signal. That is, the reconstructed signal of the neighbor cell channel is removed from a reception signal to obtain a corrected signal to complete successive interference cancellation on the current interfering user cell channel. More specifically, the reception signal is shown in equation (1):

$$r = Sb + n \quad \text{equation (1)}$$

In equation (1), r is the reception signal, b is a transmission signal, and S is a system matrix. Assuming that $b_k s_k$ in the transmission signal b is a user-expected signal, it is obtained from equation (1):

$$r = b_k s_k + \sum_{j \neq k} b_j s_j + n \quad \text{equation (2)}$$

In equation (2), $s_k$ and $s_j$ are spreading codes of a neighbor cell user or a service cell user, respectively, $b_k$ and $b_j$ are channel estimations of the neighbor cell user or the service cell user, respectively, and n is a Gaussian white noise. The reception signal r is obtained from the spreading codes $s_k$ and $s_j$ and the convolutions of the channel estimations $b_k$ and $b_j$ of the neighbor cell user and the service cell user, respectively. After obtaining the reconstructed signal $\hat{b}_j s_j$, the reconstructed signal $\hat{b}_j s_j$ is removed from the reception signal r to obtain a corrected signal $r_k$, as:

$$r_k = r - \hat{b}_j s_j$$

After the step of completing the successive interference cancellation on the interfering user channel, a channel activation detection is performed on the interfering user channel. When a detection result of the interfering user channel is a non-active channel, the non-active channel is removed. When the detection result of the interfering user channel is an active channel, the active channel is kept.

In the embodiment, the successive interference cancellation comprises performing the successive interference cancellation on a $K_m$ number of interfering user channels for an M number of times, where $K_m$ is the total number of interfering user channels of an $m^{th}$ successive interference cancellation, and $1 \leq m \leq M$. More specifically, after completing the $m^{th}$ successive interference cancellation in the channel activation detection of the interfering user channel, the channel activation detection is performed on the $K_m$ number of interfering user channels, and the interfering user channels kept from the $K_m$ number of interfering user channels are arranged in a decreasing order according to channel power of the active channels to get ready for a next successive interference cancellation. In the embodiment, the computation iteration number M is 6 to 8. In an alternative embodiment, the value M can be determined according to performance requirements. Since the non-active interfering user channels are removed after each repeating successive interference cancellation, the total number of the interfering user channels of an $(m+1)^{th}$ successive interference cancellation is smaller than the total number of the interfering user channels of the $m^{th}$ successive interference cancellation, i.e., $K_{m+1} \leq K_m$. In another embodiment, after completing the successive interference cancellation on the current interfering user channel and before performing the successive interference cancellation on a next interfering user channel, the channel activation detection on the current interfering user channel may also be performed. Through the channel activation detection on the channels, non-active interfering user channels are removed, so that accuracy of the successive interference cancellation is effectively enhanced while reducing a processing time and system power consumption.

After the step of completing the successive interference cancellation on the current interfering user channel, the successive interference cancellation is iterated for a next interfering user channel. That is, whether a next interfering user channel is a neighbor cell channel or a service cell channel is determined. When the next interfering user channel is the neighbor cell channel, the corresponding reconstruction signal of the neighbor cell channel of the next interfering user channel is removed from the corrected signal to update the corrected signal. After completing the successive interference cancellation on all the interfering user channels, i.e., after completing the M number of times of successive interference cancellation on the $K_m$ number of interfering user channels, the corrected signal obtained includes the expected user signal of the neighbor cell.

Further, when a determination result of step S101 indicates that the interfering user channel is the service cell channel, as the service cell channel corresponds to AFC tracking of the service cell and no large frequency shift is caused between time slots, a tentative ruling for a user signal of the service cell channel is directed determined without correcting the phase rotation. The user signal of the service cell channel is obtained from a spreading code and a convolution of a channel estimation of a service cell user.

After determining the tentative ruling for the user signal of the service cell channel, the signal reconstruction is directly performed on the service cell channel without restoring the phase rotation to obtain a reconstructed signal of the service cell channel.

The reconstructed signal of the service cell channel is removed from the reception signal to obtain the corrected signal, and thus completing the successive interference cancellation on the current interfering user channel.

After the step of completing the successive interference cancellation on the current interfering user channel, the successive interference cancellation on the next interfering user channel is iterated. After completing the successive interference cancellation on all the interfering user channels, the corrected signal obtain comprises an expected user signal of the service cell, as:

$$r_k = r - \sum_{j \neq k} \hat{b}_j s_j$$

Wherein, $$\sum_{j \neq k} \hat{b}_j s_j$$

is the reconstructed signal of the neighbor cell channel or the reconstructed signal of the service cell channel corresponding to the interfering user channels, and the corrected signal $r_k$ comprises the expected user signal of the neighbor cell and the expected user signal of the service cell.

It can be easily appreciated that, when the determination result of step S101 is the neighbor cell channel, the phase rotation of the neighbor cell channel is corrected and restored; when the determination result of step S101 is the service cell channel, the phase rotation of the service cell channel need not be corrected nor restored.

Figure 3:
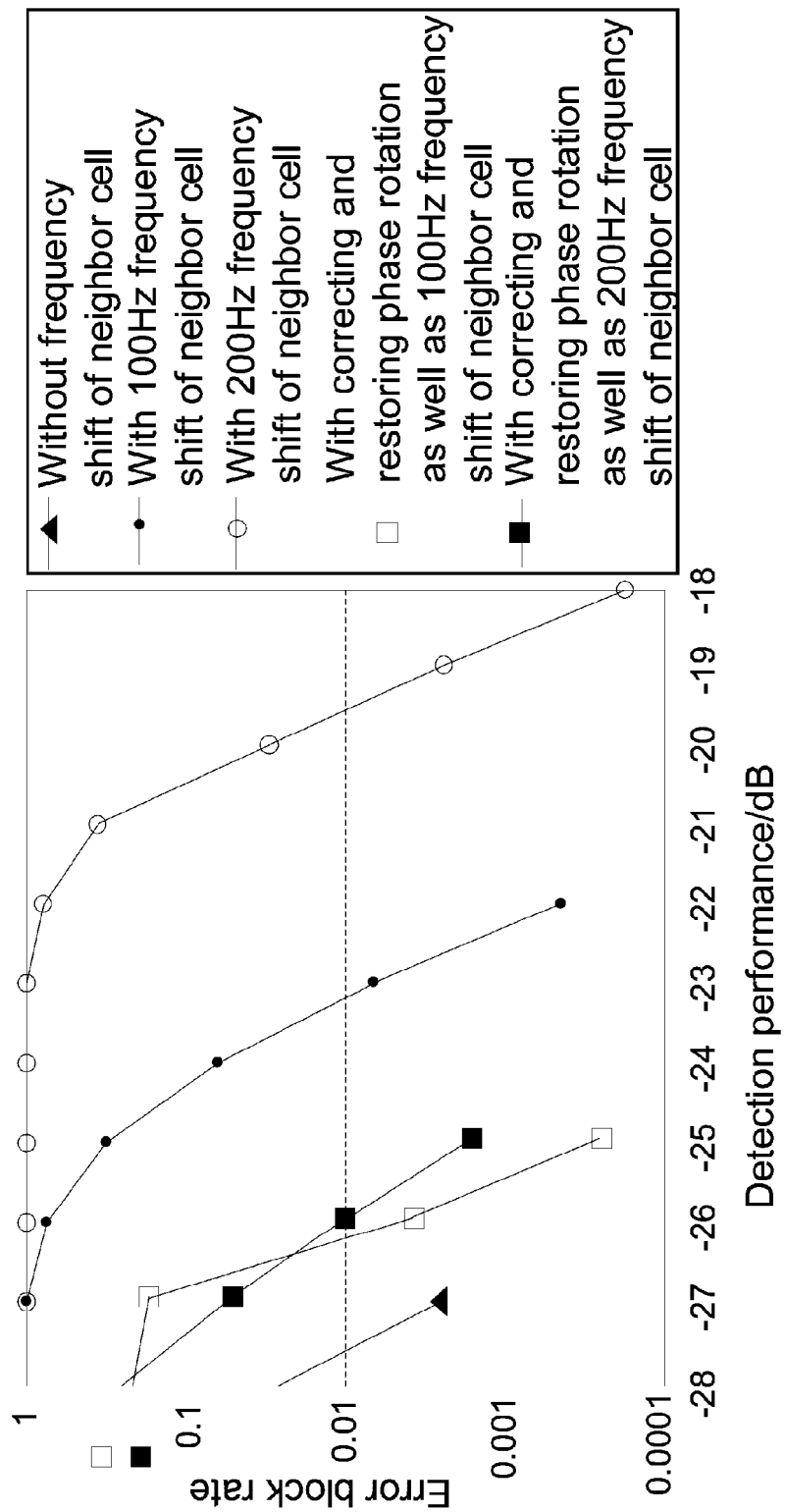
FIG. 3 is a simulation diagram of detection performance of a successive interference cancellation method according to an embodiment of the present invention.

Referring to FIG. 3, as previously stated, assuming an error block rate is 0.01, detection performance of successive interference cancellation without considering the frequency shift of a neighbor cell channel is −27.3 dB, detection performance of successive interference cancellation with a 100 Hz frequency shift in a neighbor cell channel is −23.2 dB, and detection performance of successive interference cancellation with a 200 Hz frequency in a neighbor cell channel is −19.5 dB. It is seen from FIG. 3 that, according to an embodiment of the present invention, after correcting and restoring the phase rotation, detection performance corresponding to successive interference cancellation with a 100 Hz frequency shift in the neighbor cell channel is −26.3 dB, and detection performance corresponding to successive interference cancellation with a 200 Hz frequency shift in the neighbor cell channel is −26 dB. Therefore, compared to detection performance of successive interference cancellation without correcting and restoring the phase rotation and with a 100 Hz frequency shift in the neighbor cell channel, detection performance of successive interference cancellation with correcting and restoring the phase rotation and with a 100 Hz frequency shift in the neighbor cell channel is increased by 3.1 dB. Further, compared to detection performance of successive interference cancellation without correcting and restoring the phase rotation and with a 200 Hz frequency shift in the neighbor cell channel, detection performance of successive interference cancellation with correcting and restoring the phase rotation and with a 200 Hz frequency shift in the neighbor cell channel is increased by 6.5 dB. In the embodiment, by correcting and restoring the phase rotation of the user signal of the neighbor cell channel, the accuracy in successive interference cancellation is increased for effectively enhancing system detection performance.

In summary, the successive interference cancellation method according to an embodiment of the present invention comprises: determining whether a current interfering user channel is a service cell channel of a service cell or a neighbor cell channel of a neighbor cell; correcting a phase rotation of a user signal of the neighbor channel when the interfering user channel is the neighbor cell channel; determining a tentative ruling for a user signal of the neighbor cell channel; restoring the phase rotation of the user signal of the neighbor cell channel; performing a signal reconstruction on the neighbor cell channel to obtain a reconstructed signal of the neighbor cell channel; and removing the reconstructed signal of the neighbor cell channel from a reception signal to obtain a corrected signal, and completing successive interference cancellation on the current interfering user channel. As such, accuracy of successive interference cancellation is increased to enhance system detection performance.

Figure 4:
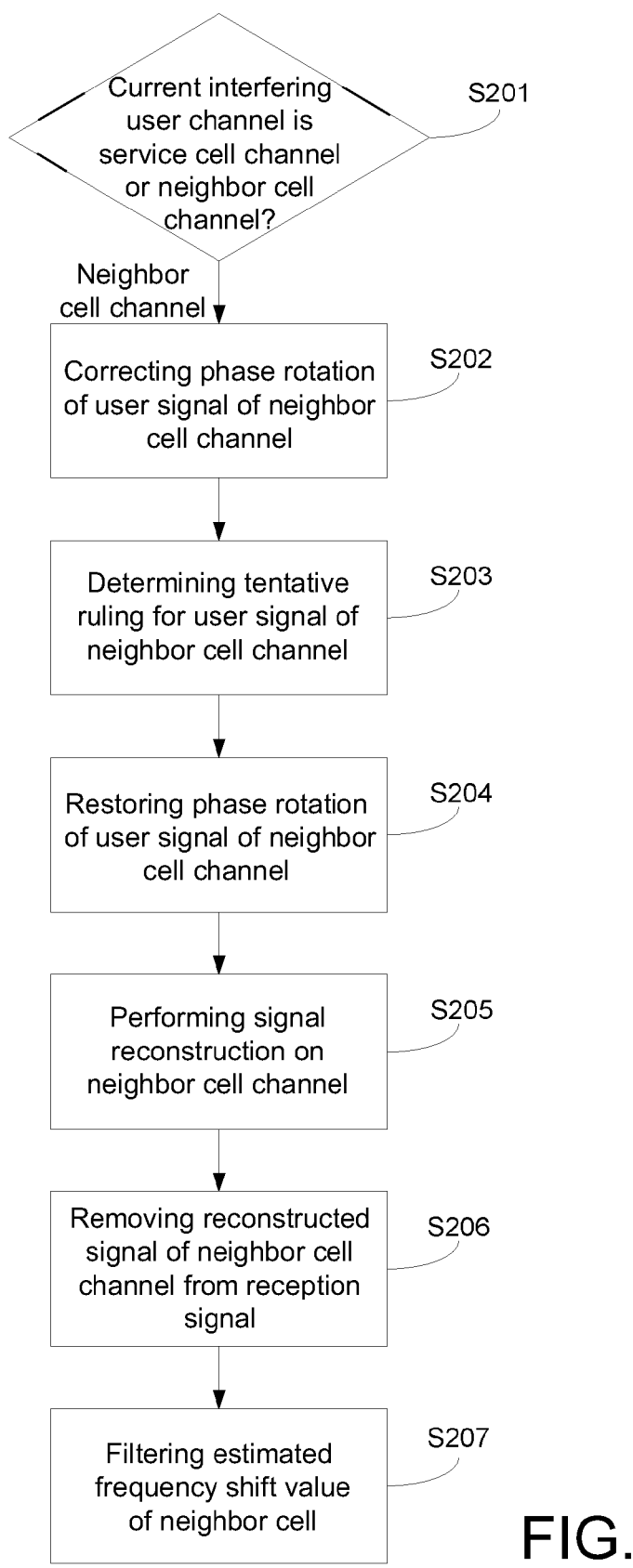
FIG. 4 is a flowchart of a detection method using successive interference cancellation according to an embodiment of the present invention.

Referring to FIG. 4, a detection method using successive interference cancellation according to an embodiment of the present invention comprises the following steps.

In step S201, whether a current interfering user cell channel is a service cell channel of a service cell or a neighbor cell channel of a neighbor cell is determined. That is, it is determined whether a current interfering user cell channel is a service cell channel of a service cell or a neighbor cell channel of a neighbor cell.

In step S202, a phase rotation of a user signal of the neighbor cell channel is corrected. When the interfering user cell channel is the neighbor cell channel, a phase rotation of a user signal of the neighbor cell channel is corrected. The user signal of the neighbor cell channel is obtained from a spreading code and a convolution of a channel estimation of a neighbor cell user.

In step S203, a tentative ruling is determined for the user signal of the neighbor cell channel. After correcting the phase rotation of the user signal of the neighbor cell channel, a tentative ruling is determined for the user signal of the neighbor cell channel. The tentative ruling of the user signal can be implemented by a hard decision or a soft decision.

In step S204, the phase rotation of the user signal of the neighbor cell channel is restored. After determining the tentative ruling on the user signal of the neighbor cell channel, the phase rotation of the user signal of the neighbor cell channel is restored.

In step S205, a signal reconstruction is performed on the neighbor cell channel. After restoring the phase rotation of the user signal of the neighbor cell channel, a signal reconstruction is performed on the neighbor cell channel to obtain a reconstructed signal of the neighbor cell channel.

In step S206, the reconstructed signal of the neighbor cell channel is removed from a reception signal. The reconstructed signal of the neighbor cell channel is removed from the reception signal to obtain a corrected signal to complete the successive interference cancellation on the current interfering user cell channel.

In step S207, an estimated frequency shift value of the neighbor ell is filtered. When a signal-to-noise ratio (SNR) of the neighbor cell is greater than an SNR threshold of the neighbor cell, an estimated frequency shift value of the neighbor cell is filtered to tracking a signal frequency shift of the neighbor cell. More specifically, the filtering step comprises: determining whether an $i^{th}$ SNR Ncell_Srn(i, n) of the neighbor cell in an $n^{th}$ time slot is greater than a neighbor cell SNR threshold Snr_thr; and performing a one-order infinite impulse response (IIR) filter on an $i^{th}$ estimated frequency shift value of the neighbor cell in the $n^{th}$ time slot to obtain a tracking value of the signal frequency shift of the neighbor cell:

Ncell_Foe_Adj(i,n)=Forgetting_factor*Ncell_Foe_Adj(i, n−1)+(1−Forgetting_factor)*Ncell_Foe(i,n);

In the above, Ncell_Foe_Adj(i, n) is the tracking value of the frequency shift of an $i^{th}$ signal of the neighbor cell in the $n^{th}$ time slot, Forgetting_factor is a forgetting factor, Ncell_Foe_Adj(i, n−1) is the tracking value of the frequency shift of an $(i-1)^{th}$ signal of the neighbor cell in the $n^{th}$ time slot, and L1 is quality according to a detection result of a same-frequency cell and the SNR of the neighbor cell. By maintaining a list of the neighbor cell and updating the forgetting factor Forgetting_factor, accurate tracking on the signal frequency shift of the neighbor cell can be achieved.

Further, when a determining result of step S201 indicates that the interfering user channel is the service cell channel, a tentative ruling for a user signal of the service cell channel is determined. The user channel of the service cell channel is obtained from a spreading code and a convolution of a channel estimation of a service cell user.

After determining the tentative ruling for the user signal of the service cell channel, the signal reconstruction is performed on the service cell channel to obtain a reconstructed signal of the service cell channel.

The reconstructed signal of the service cell channel is removed from the reception signal to obtain a corrected signal, and thus completing the successive interference cancellation on the current interfering user channel.

After the step of completing the successive interference cancellation on the current interfering user channel, the successive interference cancellation on the next interfering user channel is iterated. After completing the successive interference cancellation on all the interfering user channels, the corrected signal obtain comprises an expected user signal of the service cell.

It can be easily appreciated that, when the determination result of step S201 is the neighbor cell channel, the phase rotation of the neighbor cell channel is corrected and restored; when the determination result of step S201 is the service cell channel, the phase rotation of the service cell channel need not be corrected nor restored.

After obtaining the expected user signal of the service cell, the detection method using successive interference cancellation further comprises: calculating an SNR and an estimated frequency shift value of the expected user signal of the service cell to obtain the SNR of the service cell and the estimated frequency shift value of the service cell; obtaining a frequency control signal according to the SNR of the service cell and the estimated frequency shift value of the service cell; and adjusting a frequency of a local oscillator according to the frequency control signal of the service cell. After obtaining the expected user signal of the service cell, the detection method using successive interference cancellation further comprises: demapping the expected user signal of the service cell to obtain a demapping value of the service cell; and decoding the mapping value of the service cell to obtain a decoding value of the service cell.

In summary, a detection method using the successive interference cancellation according to an embodiment of the present invention comprises: determining whether a current interfering user channel is a service cell channel of a service cell or a neighbor cell channel of a neighbor cell; correcting a phase rotation of a user signal of the neighbor channel when the interfering user channel is the neighbor cell channel; determining a tentative ruling for a user signal of the neighbor cell channel; restoring the phase rotation of the user signal of the neighbor cell channel; performing a signal reconstruction on the neighbor cell channel to obtain a reconstructed signal of the neighbor cell channel; and removing the reconstructed signal of the neighbor cell channel from a reception signal to obtain a corrected signal, and completing the successive interference cancellation on the current interfering user channel. As such, accuracy of successive interference cancellation as well as system detection performance is increased to achieve accuracy tracking on signal frequency shift of the neighbor cell.

Figure 5:
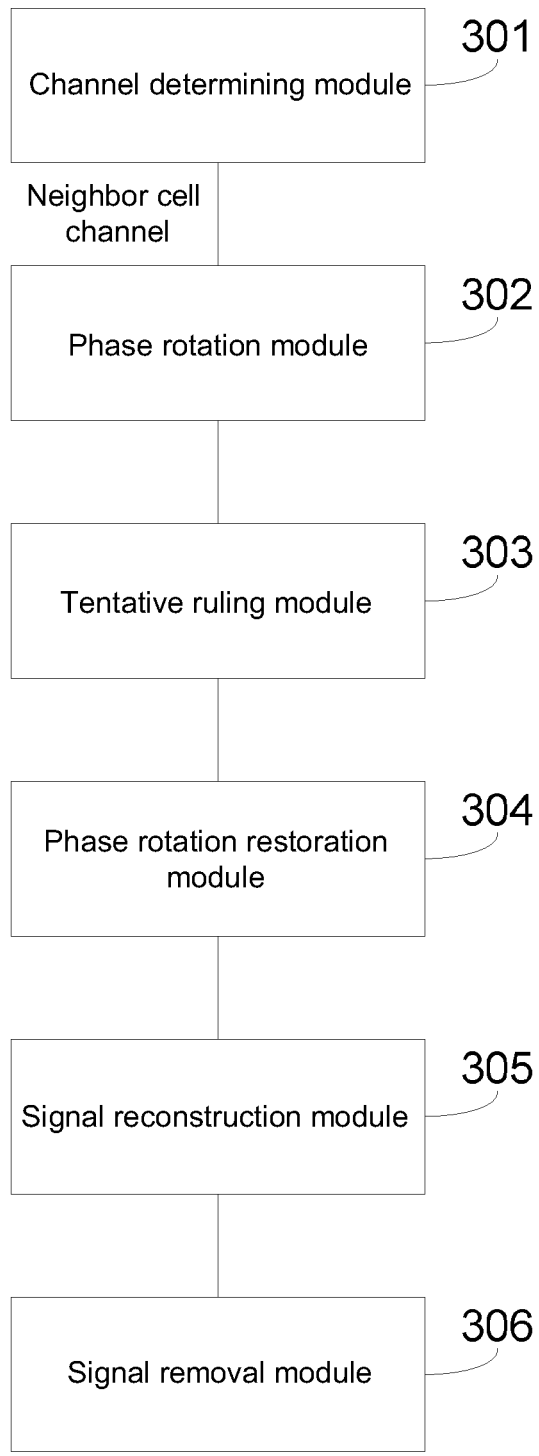
FIG. 5 is a block diagram of a successive interference cancellation apparatus according to an embodiment of the present invention.

FIG. 5 shows a successive interference cancellation apparatus according to an embodiment. Referring to FIG. 5, the successive interference cancellation apparatus comprises a channel determination module 301, a phase rotation correction module 302, a tentative ruling module 303, a phase rotation restoration module 304, a signal reconstruction module 305, and a signal removal module 306.

The channel determination module 301 determines whether a current interfering user cell channel is a service cell channel of a service cell or a neighbor cell channel of a neighbor cell.

The phase rotation correction module 302, when the interfering user cell channel is the neighbor cell channel, corrects a phase rotation of a user signal of the neighbor cell channel. The user signal of the neighbor cell channel is obtained from a spreading code and a convolution of a channel estimation of a neighbor cell user.

More specifically, the phase rotation correction module 302 corrects the phase rotation of the user signal of the neighbor cell channel by a CORDIC algorithm. More specifically, the CORDIC algorithm is as:

$$\hat{r}_{n,k} = r_{n,k} * (d_{R,i+1} + j * d_{I,i+1}) * e^{j*\theta_{i+1}}$$

$$\begin{cases} d_{R,i+1} = K_i[d_{R,i} - d_{I,i} \cdot s_i \cdot 2^{-i}] \\ d_{I,i+1} = K_i[d_{I,i} + d_{R,i} \cdot s_i \cdot 2^{-i}] \\ \theta_{i+1} = \theta_i - s_i \cdot \tan^{-1}(2^{-i}) \\ K_i = 1/\sqrt{1 + 2^{-2 \cdot i}} \\ s_i = -1, \theta_i < 0 \\ s_i = 1, \theta_i \geq 0 \end{cases}$$

Wherein, $r_{n,k}$ is a frequency control signal of the neighbor cell, and $\hat{r}_{n,k}$ is the user signal of the neighbor cell after correcting the phase rotation.

The tentative ruling module 303, after the phase rotation correction module 302 corrects the phase rotation of the user signal of the neighbor cell channel, determines a tentative ruling for the user signal of the neighbor cell channel.

The phase rotation restoration module 304, after the tentative ruling module 303 determines the tentative ruling for the user signal of the neighbor cell channel, restores the phase rotation of the user signal of the neighbor cell channel.

The signal reconstruction module 305, after the phase rotation restoration module 304 restores the phase rotation of the user signal of the neighbor cell channel, performs a signal reconstruction on the neighbor cell channel to obtain a reconstructed signal of the neighbor cell channel.

The signal removal module 306 removes the reconstructed signal, obtained by the signal reconstruction module 305, from a reception signal to obtain a corrected signal to complete the successive interference cancellation on the current interfering user cell channel. The reception signal is obtained from spreading codes and convolutions of channel estimations of the neighbor cell user and a service cell user, respectively.

The successive interference cancellation apparatus further comprises a channel activation detection module and a channel processing module.

The channel activation detection module, after the step of completing the successive interference cancellation on the current interfering user channel, performs a channel activation detection on the interfering user channel.

When a detection result of the interfering user channel is a non-active channel, the channel processing module removes the non-active channel. When the detection result of the interfering user channel is an active channel, the channel processing module keeps the active channel.

After the step of completing the successive interference cancellation on the current interfering user channel, the successive interference cancellation apparatus further iterates the successive interference cancellation on a next interfering user channel. The corrected signal obtain comprises an expected user signal of the service cell after completing the successive interference cancellation on all the interfering user channels. Further, the successive interference cancellation is performed on the current interfering user channel according to a decreasing order of channel power of the interfering user channels.

The tentative ruling module 303, when a determination result of the channel determination module 301 indicates that the interfering user channel is the service cell module, directly determines a tentative ruling on a user signal of the service cell channel. The user signal of the service cell channel is obtained from a spreading code and a convolution of a channel estimation of a service cell user.

The signal reconstruction module 305, after the tentative ruling is determined on the user signal of the service cell channel, performs the signal reconstruction on the service cell channel to obtain a reconstructed signal of the service cell channel.

The signal removal module 306 further removes the reconstructed signal of the service cell channel from the reception signal to obtain the corrected signal to complete the successive interference cancellation on the current interfering user channel.

It can be easily appreciated that, when the determination result of the channel determination module 301 is the neighbor cell channel, the phase rotation is corrected and restored for the neighbor cell channel; when determination result of the channel determination module 301 is the service cell channel, the phase rotation need not be corrected nor restored for the service cell channel.

After completing the successive interference cancellation on the current interfering user channel, the successive interference cancellation apparatus further iterates the successive interference cancellation on a next interfering user channel. The corrected signal obtain comprises an expected user signal of the service cell after completing the successive interference cancellation on all the interfering user channels.

In summary, in a successive interference cancellation apparatus according to an embodiment of the present invention, a determination module determines whether a current interfering user channel is a service cell channel of a service cell or a neighbor cell channel of a neighbor cell. When the interfering user channel is the neighbor cell channel, a phase rotation correction module corrects a phase rotation of the user signal of the neighbor cell channel, a tentative ruling module determines a tentative ruling for the user signal of the neighbor cell, a phase rotation restoration module restores the phase rotation of the user signal of the neighbor cell channel, a signal construction signal performs a signal reconstruction on the neighbor cell channel to obtain a reconstructed signal, and a signal removal module removes the reconstructed signal of the neighbor cell channel from a reception signal to obtain a corrected signal to complete the successive interference cancellation on the current interfering user channel. As such, accuracy of successive interference cancellation is increased to enhance system detection performance.

Figure 6:
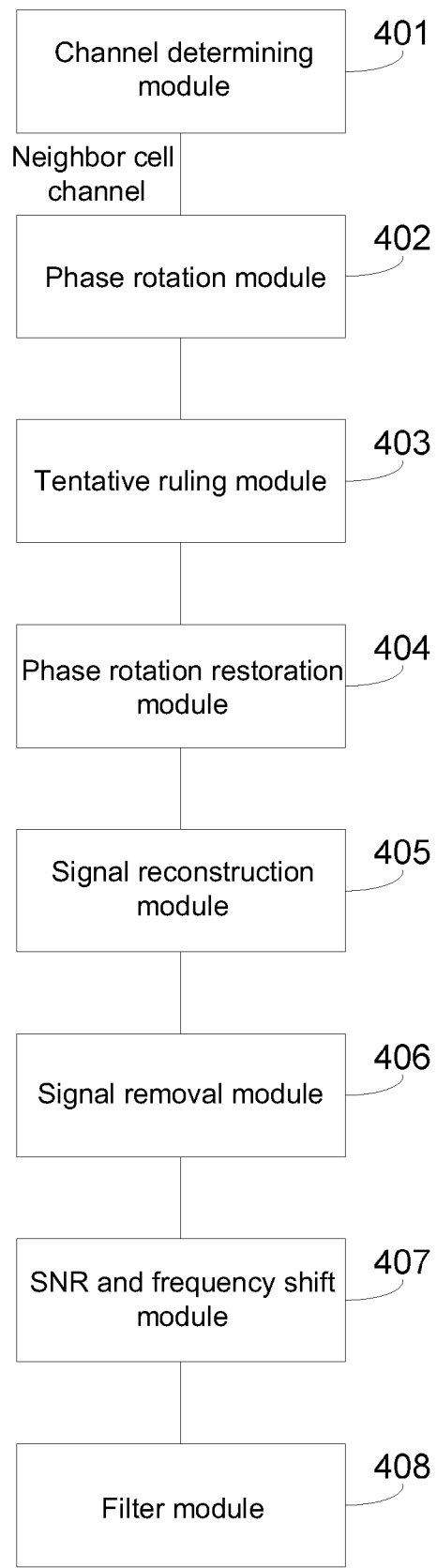
FIG. 6 is a block diagram of a detection apparatus using successive interference cancellation according to an embodiment of the present invention.

FIG. 6 shows a detection apparatus using successive interference cancellation according to an embodiment of the present invention. Referring to FIG. 6, the detection apparatus comprises a channel determination module 401, a phase rotation correction module 402, a tentative ruling module 403, a phase rotation restoration module 404, a signal reconstruction module 405, and a signal removal module 406.

The channel determination module 401 determines whether a current interfering user cell channel is a service cell channel of a service cell or a neighbor cell channel of a neighbor cell.

The phase rotation correction module 402, when the interfering user cell channel is the neighbor cell channel, corrects a phase rotation of a user signal of the neighbor cell channel. The user signal of the neighbor cell channel is obtained from a spreading code and a convolution of a channel estimation of a neighbor cell user.

The tentative ruling module 403, after the phase rotation correction module 402 corrects the phase rotation of the user signal of the neighbor cell channel, determines a tentative ruling for the user signal of the neighbor cell channel.

The phase rotation restoration module 404, after the tentative ruling module 403 determines the tentative ruling for the user signal of the neighbor cell channel, restores the phase rotation of the user signal of the neighbor cell channel.

The signal reconstruction module 405, after the phase rotation restoration module 404 restores the phase rotation of the user signal of the neighbor cell channel, performs a signal reconstruction on the neighbor cell channel to obtain a reconstructed signal of the neighbor cell channel.

After the completing the successive interference cancellation on the current interfering user channel, the detection apparatus using successive interference cancellation further iterates the successive interference cancellation on a next interfering user channel. The corrected signal obtain comprises an expected user signal of the neighbor cell after completing the successive interference cancellation on all the interfering user channels.

The detection apparatus using successive interference cancellation further comprises an SNR and frequency shift module 407 and a filter module 408.

The SNR and frequency shift module 407 calculates an SNR and an estimated frequency shift value of the expected user signal of the neighbor cell to obtain the SNR of the neighbor cell and the and an estimated frequency shift value of the neighbor cell.

The filter module 408, when the SNR of the neighbor cell is greater than an SNR threshold of the neighbor cell, filters the estimated frequency shift value to track a signal frequency shift of the neighbor cell.

The tentative ruling module 403, when a determination result of the channel determination module 401 indicates that the interfering user channel is the service cell module, determines a tentative ruling for a user signal of the service cell channel. The user signal of the service cell channel is obtained from a spreading code and a convolution of a channel estimation of a service cell user. The signal reconstruction module 405, after the tentative ruling is determined for the user signal of the service cell channel, performs a signal reconstruction on the service cell channel to obtain a reconstructed signal of the service cell channel. The signal removal module 406 further removes the reconstructed signal of the service cell channel from the reception signal to obtain the corrected signal to complete the successive interference cancellation on the current interfering user channel.

It can be easily appreciated that, when the determination result of the channel determination module 401 is the neighbor cell channel, the phase rotation is corrected and restored for the neighbor cell channel; when determination result of the channel determination module 401 is the service cell channel, the phase rotation need not be corrected nor restored for the service cell channel.

After completing the successive interference cancellation on the current interfering user channel, the detection apparatus using successive interference cancellation iterates the successive interference cancellation on a next interfering user channel. The corrected signal obtain comprises an expected user signal of the service cell after completing the successive interference cancellation on all the interfering user channels. The SNR and frequency shift module 407 further calculates an SNR and an estimated frequency shift value of the expected user signal of the service cell to obtain the SNR of the service cell and the estimated frequency shift value of the service cell.

The detection apparatus using successive interference cancellation further comprises: a frequency control signal obtaining module, for obtaining a frequency control signal of the service cell according to the SNR of the service cell and the estimated frequency shift value of the service cell; a frequency adjustment module, for adjusting a frequency of a local oscillator according to the frequency control signal of the service cell; a demapping module, for demapping the expected user signal of the service cell to obtain a demapping value of the service cell; and a decoding module, for decoding the demapping value of the service cell to obtain a decoding value of the service cell.

In summary, in a detection method using the successive interference cancellation according to an embodiment of the present invention, a determination module determines whether a current interfering user channel is a service cell channel of a service cell or a neighbor cell channel of a neighbor cell. When the interfering user channel is the neighbor cell channel, a phase rotation correction module corrects a phase rotation of the user signal of the neighbor cell channel, a tentative ruling module determines a tentative ruling for the user signal of the neighbor cell, a phase rotation restoration module restores the phase rotation of the user signal of the neighbor cell channel, a signal construction signal performs a signal reconstruction on the neighbor cell channel to obtain a reconstructed signal, and a signal removal module removes the reconstructed signal of the neighbor cell channel from a reception signal to obtain a corrected signal to complete the successive interference cancellation on the current interfering user channel. As such, accuracy of successive interference cancellation as well as system detection performance is enhanced to achieve accurate tracking on a signal frequency shift of the neighbor cell.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A successive interference cancellation method, comprising:
    determining whether a current interfering user channel is a service cell channel or a neighbor cell channel;
    correcting a phase rotation of a user signal of the neighbor cell channel when the interfering user channel is the neighbor cell channel, wherein the user signal is obtained from a spreading code and a convolution of a channel estimation of a neighbor cell user;
    determining a tentative ruling for the user signal of the neighbor cell channel after correcting the phase rotation of the user signal of the neighbor cell channel;
    restoring the phase rotation of the user signal of the neighbor cell channel after determining the tentative ruling for the user signal of the neighbor cell channel;
    performing a signal reconstruction on the neighbor cell channel to obtain a reconstructed signal of the neighbor cell channel after restoring phase rotation of the user signal of the neighbor cell channel; and
    removing the reconstructed signal of the neighbor cell channel from a reception signal, and completing successive interference cancellation on the current interfering user channel, wherein the reception signal is obtained from a first spreading code and a first convolution of a first channel estimation and a second spreading code and a second convolution of a second channel estimation of the neighbor cell user and a service cell user, respectively.

2. The method according to claim 1, after the step of completing the successive interference cancellation on the interfering user channel, further comprising:
    performing a channel activation detection on the interfering user channel; and
    when a detection result of the interfering user channel indicates the interfering user channel is a non-active channel, removing the non-active channel; when the detection result indicates the interfering user channel is an active channel, keeping the active channel.

3. The method according to claim 1, wherein the step of correcting the phase rotation of the user signal of the neighbor cell channel comprises:
    correcting the phase rotation of the user signal of the neighbor cell channel by a coordinate rotation digital computer (CORDIC) algorithm, wherein the CORDIC algorithm is represented as:

$$\hat{r}_{n,k} = r_{n,k} * (d_{R,i+1} + j * d_{I,i+1}) * e^{j*\theta_{i+1}}$$

$$\begin{cases} d_{R,i+1} = K_i [d_{R,i} - d_{I,i} \cdot s_i \cdot 2^{-i}] \\ d_{I,i+1} = K_i [d_{I,i} + d_{R,i} \cdot s_i \cdot 2^{-i}] \\ \theta_{i+1} = \theta_i - s_i \cdot \tan^{-1}(2^{-i}) \\ K_i = 1 / \sqrt{1 + 2^{-2i}} \\ s_i = -1, \theta_i < 0 \\ s_i = 1, \theta_i \geq 0 \end{cases}$$

wherein, $r_{n,k}$ is a frequency control signal of the neighbor cell, $\hat{r}_{n,k}$ is the user signal of the neighbor cell channel after correcting the phase rotation, $K_i$ is an amplitude factor associated with a computation iteration number i, $K_i$ is approximately 0.6073, $s_i$ is a direction of rotation, $d_R$ is a real component of a CORDIC complex number, $d_I$ is an imaginary component of a CORDIC complex number.

4. The method according to claim 1, after the step of completing the successive interference cancellation on the interfering user channel, further comprising:
    iterating the successive interference cancellation on a next interfering user channel to obtain a corrected signal comprising an expected user signal of the neighbor cell after completing the successive interference cancellation on all the interfering user channels;
    wherein, the successive interference cancellation is performed on the current interfering user channel according to a decreasing order of channel power of the interfering user channels.

5. The method according to claim 1, further comprising:
    when the interfering user channel is the service cell channel, determining a tentative ruling for a user signal of the service cell channel, wherein the user signal of the service cell channel is obtained from a spreading code and a convolution of a channel estimation of a service cell user;
    performing the signal reconstruction on the service cell channel to obtain a reconstructed signal of the service cell channel after determining the tentative ruling for the user signal of the service cell channel;
    removing the reconstructed signal of the service cell channel from the reception signal and completing the successive interference cancellation on the current interfering user channel; and iterating the successive interference cancellation on a next interfering user channel after the step of completing the successive interference cancellation on the current interfering user channel, wherein the corrected signal obtained after completing the successive interference cancellation on the interfering user channels further comprises an expected user signal of the service cell.

6. A detection method using successive interference cancellation, comprising:
   determining whether a current interfering user channel is a service cell channel or a neighbor cell channel;
   correcting a phase rotation of a user signal of the neighbor cell channel when the interfering user channel is the neighbor cell channel, wherein the user signal is obtained from a spreading code and a convolution of a channel estimation of a neighbor cell user;
   determining a tentative ruling for the user signal of the neighbor cell channel after correcting the phase rotation of the user signal of the neighbor cell channel;
   restoring the phase rotation of the user signal of the neighbor cell channel after determining the tentative ruling for the user signal of the neighbor cell channel;
   performing a signal reconstruction on the neighbor cell channel to obtain a reconstructed signal of the neighbor cell channel after restoring phase rotation of the user signal of the neighbor cell channel; and
   removing the reconstructed signal of the neighbor cell channel from a reception signal and completing successive interference cancellation on the current interfering user channel, wherein the reception signal is obtained from a first spreading code and a first convolution of a first channel estimation and a second spreading code and a second convolution of a second channel estimation of the neighbor cell user and a service cell user, respectively.

7. The detection method according to claim 6, after the step of completing the successive interference cancellation on the current interfering user channel, further comprising:
   iterating the successive interference cancellation on a next interfering user channel to obtain a corrected signal comprising an expected user signal of the neighbor cell after completing the successive interference cancellation on all the interfering user channels;
   calculating a signal-to-noise ratio (SNR) and an estimated frequency shift value of the expected user signal of the neighbor cell to obtain the SNR of the neighbor cell and the estimated frequency shift value of the neighbor cell;
   when the SNR of the neighbor cell is greater than an SNR threshold of the neighbor cell, filtering the estimated frequency shift value of the neighbor cell to track a signal frequency shift of the neighbor cell.

8. The method according to claim 6, further comprising:
   when the interfering user channel is the service cell channel, determining a tentative ruling for a user signal of the service cell channel, wherein the user signal of the service cell channel is obtained from a spreading code and a convolution of a channel estimation of a service cell user;
   performing the signal reconstruction on the service cell channel to obtain a reconstructed signal of the service cell channel after determining the tentative ruling for the user signal of the service cell channel;
   removing the reconstructed signal of the service cell channel from the reception signal and completing the successive interference cancellation on the current interfering user channel;
   iterating the successive interference cancellation on a next interfering user channel after the step of completing the successive interference cancellation on the current interfering user channel, wherein the corrected signal obtained after completing the successive interference cancellation on the interfering user channels further comprises an expected user signal of the service cell;
   after obtaining the expected user signal of the service cell, the detection method further comprising:
   calculating an SNR and an estimated frequency shift value of the expected user signal of the service cell obtain the SNR and the estimated frequency shift value of the service cell;
   obtaining a frequency control signal of the service cell according to the SNR of the service cell and the estimated frequency shift value of the service cell; and
   adjusting a frequency of a local oscillator according to the frequency control signal of the service cell; and
   after obtaining the expected user signal of the service cell, the detection method further comprising:
   demapping the user expected signal of the service cell to obtain a demapping value of the service cell; and
   decoding the demapping value of the service cell to obtain a decoding value of the service cell.

9. A successive interference cancellation apparatus, comprising:
   a channel determination module, for determining whether a current interfering user channel is a service cell channel or a neighbor cell channel;
   a phase rotation correction module, for correcting a phase rotation of a user signal of the neighbor cell channel when the interfering user channel is the neighbor cell channel, wherein the user signal is obtained from a spreading code and a convolution of a channel estimation of a neighbor cell user;
   a tentative ruling module, determining a tentative ruling for the user signal of the neighbor cell channel after correcting the phase rotation of the user signal of the neighbor cell channel;
   a phase restoration module, for restoring the phase rotation of the user signal of the neighbor cell channel after determining the tentative ruling for the user signal of the neighbor cell channel;
   a signal reconstruction module, for performing a signal reconstruction on the neighbor cell channel to obtain a reconstructed signal of the neighbor cell channel after restoring phase rotation of the user signal of the neighbor cell channel; and
   a signal removal module, removing the reconstructed signal of the neighbor cell channel from a reception signal and completing successive interference cancellation on the current interfering user channel, wherein the reception signal is obtained from a first spreading code and a first convolution of a first channel estimation and a second spreading code and a second convolution of a second channel estimation of the neighbor cell user and a service cell user, respectively.

10. The apparatus according to claim 9, further comprising:
   a channel activation detection module, for performing a channel activation detection on the interfering user channel; and
   a channel processing module, for removing the non-active channel when a detection result indicates the interfering user channel is a non-active channel, and keeping the active channel when the detection result indicates the interfering user channel is an active channel.

11. The apparatus according to claim 9, wherein the phase rotation correction module corrects the phase rotation of the user signal of the neighbor cell channel by a CORDIC algorithm, and the CORDIC algorithm is as:

$$\hat{r}_{n,k} = r_{n,k} * (d_{R,i+1} + j * d_{I,i+1}) * e^{j*\theta_{i+1}}$$

$$\begin{cases} d_{R,i+1} = K_i[d_{R,i} - d_{I,i} \cdot s_i \cdot 2^{-i}] \\ d_{I,i+1} = K_i[d_{I,i} + d_{R,i} \cdot s_i \cdot 2^{-i}] \\ \theta_{i+1} = \theta_i - s_i \cdot \tan^{-1}(2^{-i}) \\ K_i = 1/\sqrt{1+2^{-2 \cdot i}} \\ s_i = -1, \theta_i < 0 \\ s_i = 1, \theta_i \geq 0 \end{cases}$$

wherein, $r_{n,k}$ is a frequency control signal of the neighbor cell, $\hat{r}_{n,k}$ is the user signal of the neighbor cell channel after correcting the phase rotation, $K_i$ is an amplitude factor associated with a computation iteration number i, $K_i$ is approximately 0.6073, $s_i$ is a direction of rotation, $d_R$ is a real component of a CORDIC complex number, $d_I$ is an imaginary component of a CORDIC complex number.

12. The apparatus according to claim 9, wherein, after completing the successive interference cancellation on the current user channel, the apparatus further iterates the successive interference cancellation on a next interfering user channel to obtain a corrected signal comprising an expected user signal of the neighbor cell after completing the successive interference cancellation on all the interfering user channels; the apparatus performs the successive interference cancellation on the current interfering user channel according to a decreasing order of channel power of the interfering user channels.

13. The apparatus according to claim 9, wherein:
the tentative ruling module, when the interfering user channel is the service cell channel, further determines a tentative ruling for a user signal of the service cell channel, wherein the user signal of the service cell channel is obtained from a spreading code and a convolution of a channel estimation of a service cell user;
the signal reconstruction module, after determining the tentative ruling for the user signal of the service cell channel, performs the signal reconstruction on the service cell channel to obtain a reconstructed signal of the service cell channel;
the signal removal module removes the reconstructed signal of the service cell channel from the reception signal and completes the successive interference cancellation on the current interfering user channel; and
the successive interference cancellation apparatus, after completing the successive interference cancellation on the current interfering user channel, iterates the successive interference cancellation on a next interfering user channel, wherein the corrected signal obtained after completing the successive interference cancellation on the interfering user channels further comprises an expected user signal of the service cell.

14. A detection apparatus using successive interference cancellation, comprising:
a channel determination module, for determining whether a current interfering user channel is a service cell channel or a neighbor cell channel;
a phase rotation correction module, for correcting a phase rotation of a user signal of the neighbor cell channel when the interfering user channel is the neighbor cell channel, wherein the user signal is obtained from a spreading code and a convolution of a channel estimation of a neighbor cell user;
a tentative ruling module, determining a tentative ruling for the user signal of the neighbor cell channel after correcting the phase rotation of the user signal of the neighbor cell channel;
a phase restoration module, for restoring the phase rotation of the user signal of the neighbor cell channel after determining the tentative ruling for the user signal of the neighbor cell channel;
a signal reconstruction module, for performing a signal reconstruction on the neighbor cell channel to obtain a reconstructed signal of the neighbor cell channel after restoring phase rotation of the user signal of the neighbor cell channel; and
a signal removal module, for removing the reconstructed signal of the neighbor cell channel from a reception signal and completing successive interference cancellation on the current interfering user channel, wherein the reception signal is obtained from a first spreading code and a first convolution of a first channel estimation and a second spreading code and a second convolution of a second channel estimation of the neighbor cell user and a service cell user, respectively.

15. The detection apparatus according to claim 14, wherein:
the detection apparatus, after completing the successive interference cancellation on the current interfering user channel, further iterates the successive interference cancellation on a next interfering user channel to obtain a corrected signal comprising an expected user signal of the neighbor cell;
the detection apparatus further comprises an SNR and frequency shift module for calculating an SNR and an estimated frequency shift value of the expected user signal to obtain the SNR of the neighbor cell and the estimated frequency shift value of the neighbor cell;
the detection apparatus further comprises a filter module, when the SNR of the neighbor cell is greater than an SNR threshold of the neighbor cell, for filtering the estimated frequency shift value of the neighbor cell to track a signal frequency shift of the neighbor cell.

16. The detection apparatus according to claim 14, wherein:
the tentative ruling module, when the interfering user channel is the service cell channel, determines a tentative ruling for a user signal of the service cell channel, wherein the user signal of the service cell channel is obtained from a spreading code and a convolution of a channel estimation of a service cell user;
the signal reconstruction module, after determining the tentative ruling for the user signal of the service cell channel, further performs the signal reconstruction on the service cell channel to obtain a reconstructed signal of the service cell channel;
the signal removal module further removes the reconstructed signal of the service cell channel from the reception signal and completes the successive interference cancellation on the current interfering user channel;
the detection apparatus, after completing the successive interference cancellation on the current interfering user channel, further iterates the successive interference cancellation on a next interfering user channel, wherein the corrected signal obtained after completing the successive interference cancellation on the interfering user channels further comprises an expected user signal of the service cell;

the detection apparatus further comprises:

an SNR and frequency shift module, for calculating an SNR and an estimated frequency shift value of the expected user signal of the service cell obtain the SNR and the estimated frequency shift value of the service cell;

a frequency control obtaining module, for obtaining a frequency control signal of the service cell according to the SNR of the service cell and the estimated frequency shift value of the service cell;

a frequency adjusting module, for adjusting a frequency of a local oscillator according to the frequency control signal of the service cell; and a demapping module, for demapping the user expected signal of the service cell to obtain a demapping value of the service cell; and a decoding module, for decoding the demapping value of the service cell to obtain a decoding value of the service cell.

* * * * *